Dec. 21, 1943.  W. C. BARNES  2,337,148
FLAW DETECTING APPARATUS
Filed May 17, 1939  2 Sheets-Sheet 2
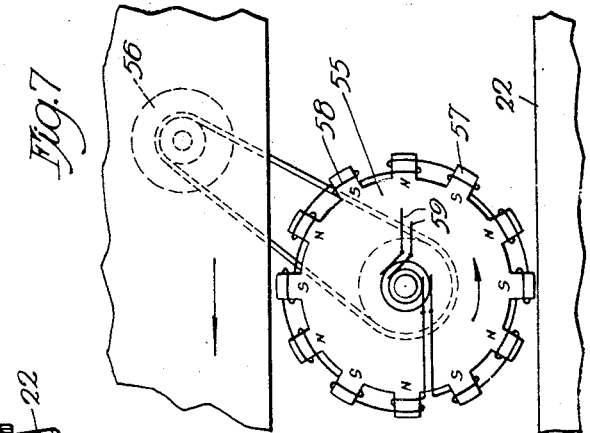
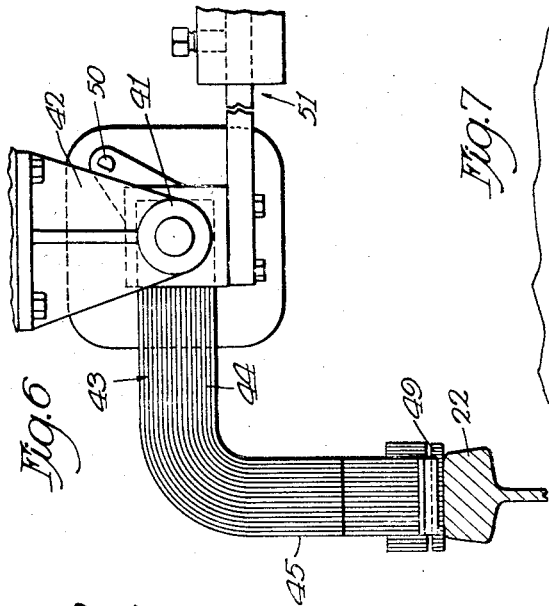
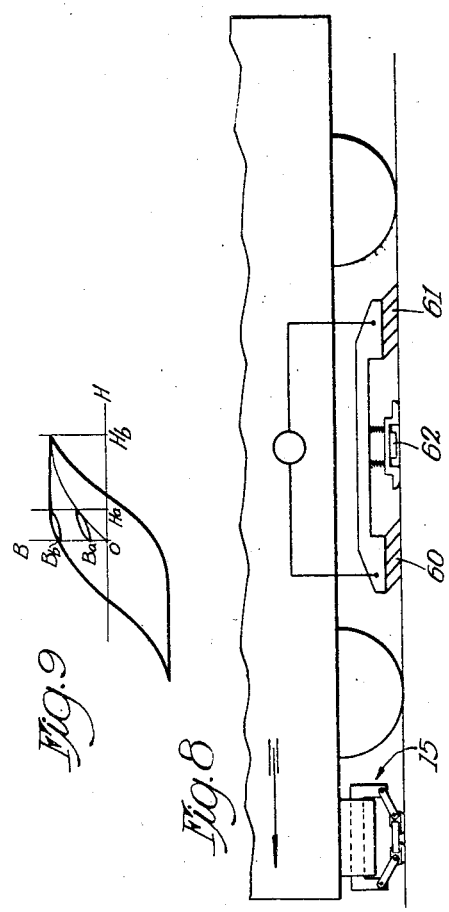
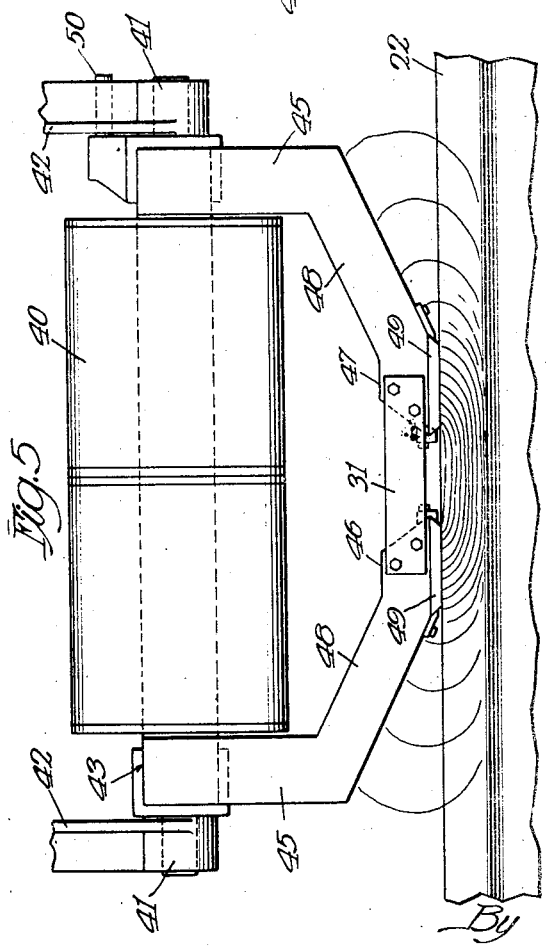
Inventor:
Walter C. Barnes
By Munn, Brown Attys.

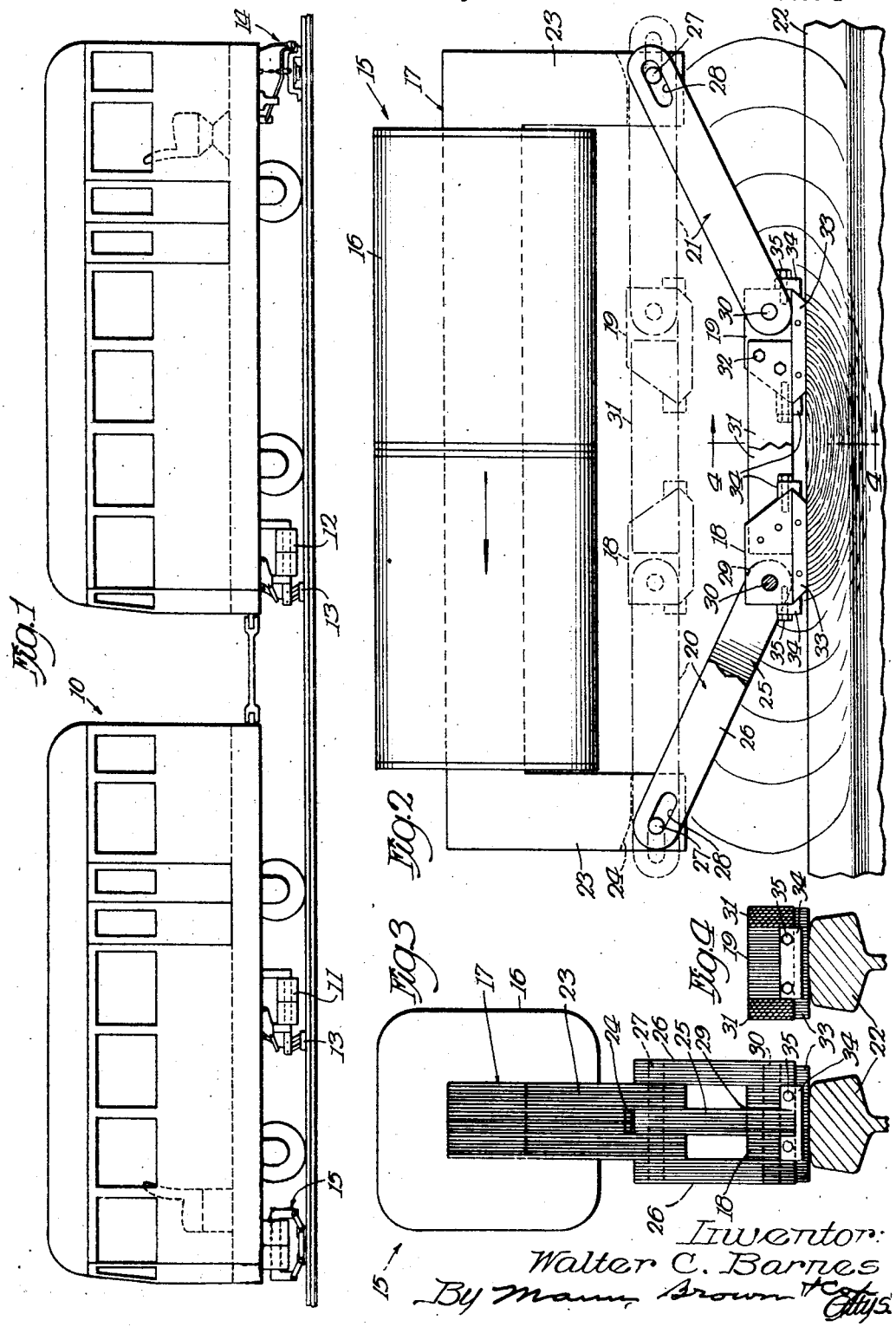

Patented Dec. 21, 1943

2,337,148

UNITED STATES PATENT OFFICE 2,337,148

FLAW DETECTING APPARATUS

Walter C. Barnes, Lake Bluff, Ill.

Application May 17, 1939, Serial No. 274,246

5 Claims. (Cl. 175—183)

In testing rails for flaws it has been observed that detector cars react differently to track that has been previously tested than to track that has not been previously tested. This phenomenon has handicapped research workers who have been endeavoring to improve the methods and apparatus used in detecting flaws in rails, because there is no assurance that the satisfactory performance of a detector car on a test track containing known fissures can be duplicated when the car is used on virgin track, i. e. track that has not been previously subjected to a strong magnetic field. As a result performance of a car on test track is of little value in determining the ability of the car to locate unknown fissures in virgin track.

One of the primary objects of this invention, therefore, is to provide means for placing virgin track in a condition that compares with that of test track which has been many times magnetized so that the observed efficiency of the car on test track may be used as a criterion for judging the efficiency of the car when testing virgin track.

This result is accomplished by applying an alternating flux to the track in advance of the flux producing means for the detecting apparatus, the alternating flux being applied in a novel manner which not only places the rail in the cyclic condition required for duplicating test track conditions, but also erases local residual magnetism that may exist in the rail due to lifting magnets, hard spots, etc. The elimination of false indications by this procedure constitutes a further object of the invention.

It is, of course, well known that an alternating magnetic flux has certain demagnetizing properties, but unless the alternating flux is applied to the body under test in a particular way it has little utility in connection with flaw detection methods. For example, a high frequency flux of a thousand cycles or more will not penetrate to the interior of the rail, and the flux having sufficient density to have any useful effect is confined to that portion of the rail in close proximity to the surface. This skin effect of high frequency flux is well known, and while it may have some effect in removing certain residual magnetic spots on the surface of rails, it is totally ineffective for placing the rail in a cyclic condition, and for removing internal residual spots, such as those left by lifting magnets.

Further and other objects and advantages will become apparent as the disclosure proceeds and the description is read in conjunction with the accompanying drawings, in which Fig. 1 is a side elevational view of a multi-section detector car using the residual magnetism method for detecting flaws in rail, the car being equipped with the alternating flux device that is the subject-matter of this invention;

Fig. 2 is an enlarged side elevational view of the alternating flux device shown in Fig. 1;

Fig. 3 is an end elevational view of the device shown in Fig. 2;

Fig. 4 is a vertical sectional view taken on the line 4—4 of Fig. 2;

Fig. 5 shows a modified form of the invention, in which the alternating current magnet is mounted on trunnions that are spaced laterally from the vertical plane which includes the rail;

Fig. 6 is an end elevational view of the alternating flux device shown in Fig. 5;

Fig. 7 is a diagrammatic side elevational view showing a third form of the invention, in which a multi-polar wheel energized by direct current is used for producing the desired alternating magnetic flux;

Fig. 8 is a diagrammatic side elevational view of a detector car using the electro-inductive method of testing for flaws, and equipped with an alternating magnetic flux device of this invention; and Fig. 9 is a diagram that will be used in explaining some of the theory that is believed to underlie the present invention.

This application is a continuation in part of my earlier application Serial No. 722,357, filed April 25, 1934, and the disclosure of that application is specifically made a part of the present disclosure. Selection of certain preferred forms of the invention is in compliance with sec. 4888 of the Revised Statutes, and limitations are not to be read into the claims unless required by the prior art.

The residual magnetism method of testing for flaws in rails consists in progressively applying a uni-directional magnetic flux to the rail, and, after the energizing flux for successive portions of the rail has been reduced to zero, progressively testing those portions of the rail for the presence of residual magnetism which is known will exist in the vicinity of fissures.

The multi-section detector car 10 (shown in Fig. 1) is equipped with apparatus for using the residual magnetism method of testing, and this apparatus consists of direct current magnets 11 and 12 having front pole pieces 13 adapted to ride upon the surface of the rail and conduct the energizing flux into the rail. The magnets do not have trailing poles (the car moves to the left in Fig. 1 during normal testing) so that the flux, in leaving the rail through the car wheels that subsequently pass over the rail, does not have a strong vertical component to destroy the polarization of the fissures.

The detector, generally indicated at 14, consists of an induction coil connected to a recording unit through a suitable amplifier. This type of detector is so well known that no attempt has been made to show the component parts of the detector in the drawings. The induction coil is responsive to the magnetic conditions which remain in the vicinity of flaws (i. e., residual magnetism) due to the energizing of the rail with uni-directional flux.

Although no attempt will be made to define the invention in terms of technical theory, it will be helpful to explain briefly some of the principles of magnetism which are believed to underlie the present invention. For example, it is well known that when a virgin piece of magnetic material is subjected to a magnetizing force of $H_a$ (Fig. 9), which force is insufficient to produce magnetic saturation in the body, subsequent removal of the energizing force will leave residual magnetism in the body which may be represented vectorially by the line O—$B_a$. If now the specimen is subjected to an energized force of $H_b$ and the force then removed, the amount of residual magnetism in the body may be represented by the line O—$B_b$. Now if the body is again subjected to the original energizing force of $H_a$, the residual magnetism is no longer represented by the line O—$B_a$ but by the line O—$B_b$. It is, therefore, obvious that the amount of residual magnetism remaining in a magnetic body, after being subjected to a given magnetizing force, depends not only upon the physical characteristics of the body, but also upon its previous history, and this fact is fully confirmed by authoritative text-books.

The problem is to place the rail that is to be tested in a cyclic condition so that for any given energization of the rail it will always produce a predetermined amount of residual magnetism when the same energizing force is again applied to the rail. In other words, the rail must be placed in a condition such that successive energization and deenergization of the body produce values of residual magnetism which correspond to points on the hysteresis loop curve indicated in heavy lines in Fig. 9.

To place a rail in the desired cyclic condition, we have found that it is necessary to apply a relatively intense low frequency alternating flux to the rail, and furthermore, that the flux must be applied in such a way that, for any given portion of the rail, a period of intense alternating flux energization is followed by a gradually diminishing alternating flux which is finally reduced to zero. Certain selected embodiments of alternating flux devices capable of accomplishing the desired results are shown in the drawings, and will now be described.

The alternating flux device, generally designated 15 (shown in Figs. 1–4 inclusive), consists of a 110 volt, 60 cycle, alternating current magnet 16, which is supported in any suitable manner from the detector car 10. The magnet is provided with a laminated core, generally designated 17, which terminates in a leading pole 18 and a trailing pole 19. The poles are connected to the core 17 by link assemblies 20, 21, respectively, which permit the entire pole assembly to be raised out of contact with the rail 22, as shown by the dotted lines in Fig. 2.

The core 17 is in the form of an inverted U and is preferably laminated, as shown in Fig. 3. The legs 23 of the core are cut away, as indicated at 24 in Fig. 3, to receive the inner arms 25 of the link assemblies 20 and 21; and these arms, together with the outer arms 26, are loosely pinned to the legs 23 by pins 27. All three arms of the link assemblies are slotted, as indicated at 28, so that when the poles are raised to the dotted lines position shown in Fig. 2 the necessary relative movement between the link assemblies and the core is accommodated.

The poles 18 and 19 are each formed of a plurality of laminations, the material used for these laminations and for the laminations of the link assemblies 20 and core 17 being of high grade transformer iron, or equivalent material. The laminations are cut away, as indicated at 29, to accommodate the required movement of the links, and all three links are pinned to the pole by a pin 30.

The poles 18 and 19 are preferably shaped, as shown in Fig. 2, to force as much flux through the rail as possible, and they are held in proper spaced relation by laminated bars 31 of non-magnetic stainless steel, or equivalent material, which are rigidly secured by bolts 32 to the outer laminations of the poles 18 and 19.

Wear shoes 33 are provided for the poles, and preferably these are held in place by clamps 34, secured to the poles by bolts 35—the arrangement being such that the shoes 33 may be forced laterally from the brackets 34 in the event that the pole assembly happens to fall inside or outside of the rail surface upon being lowered, or on a curve. In this way the rest of the magnet assembly is protected from possible damage due to this cause. Preferably the shoes 33 are made of high grade iron having good wearing qualities as well as good magnetic properties.

When the pole assembly of the alternating flux device 15 has been lowered, the parts are in the position shown in full lines in Fig. 2, with the pin 27 associated with the forward link assembly 20 transmitting the force that is necessary to move the pole assembly along the rail. The pin 27, associated with the trailing link 21, has limited movement in the slot 28 (Fig. 2), so that the pole assembly may ride freely upon the rail 22 and yet be limited in its downward movement to a point that protects the pole assembly from possible damage. The lifting mechanism for the pole assembly being unimportant here, is not shown.

It will be seen that as the alternating flux device 15 is moved to the left over the rail, the flux is concentrated between the poles 18 and 19 as the flux progressively travels through the rail. The trailing link assembly 21, however, which constitutes a part of the pole 19, also receives some of the alternating flux directly from the rail 22, due to the fact that it provides a gradually increasing air gap between the pole 19 and the rail. Likewise, the link assembly 20 provides a gradually increasing flux to successive portions of the rail as the device is moved to the left. In other words, as the device 15 is moved along the rail in either direction each portion of the rail is successively subjected to an alternating flux which starts at zero, gradually increases until it reaches a maximum, and then gradually diminishes to zero. When the magnet 15 is energized with 110 volt, 60 cycle alternating current it is possible in this way to subject the entire rail to several cycles (five or more) of alternating flux having these special characteristics while the car is being moved along the rail at the usual rate of five to eight miles an hour. The gradual diminishing flux places the rail in a condition which makes uniformity of testing results possible on virgin rail as well as on track that has been previously tested or subjected to magnetic fields. Obviously the number of reversal cycles can be increased by either increasing the frequency of the alternating flux, or by increasing the length of the magnet and pole assembly, or both.

The fact that the alternating flux device gives the same treatment to the rail on forward or backward runs permits three applications of the alternating flux prior to testing on a repeat run.

In the form of the invention shown in Fig. 5, the alternating flux device consists of a magnet 40 that is mounted on trunnion bearings 41 cooperating with brackets 42 that are rigidly secured to the car underframe. The trunnion bearings are parallel to the rail 22, but are placed inwardly with respect to the vertical plane throught the rail, as best shown in Fig. 6. The core 43 of the magnet is laminated, and extends horizontally, as shown at 44, toward the rail 22, then downwardly, as at 45, to the poles 46 and 47, each of which includes an inclined arm 48 positioned over the rail 22. The poles are equipped with shoes 49, as in Fig. 2, and the action of the device in producing an intense alternating flux through the rail, followed by a gradually diminishing alternating flux, is the same as has been previously described with reference to the device shown in Fig. 2.

Since the magnet 40 is mounted to one side, as shown in Fig. 2, it is obvious that the poles 46 and 47 will ride easily upon the rail 22, accommodating any unevenness in the rail by slightly rotating the magnet 40 on the trunnion bearings 41. Preferably an adjustable counterweight 51, or equivalent device, is used to control the pressure exerted by the poles 46 and 47 on the rail. If desired a stop 50 may be provided to limit the downward movement of the poles 46 and 47.

In Fig. 7 the effect of an alternating flux of gradually diminishing intensity is produced by a multi-polar wheel 55, which is rotated by suitable means, such as a source of rotational energy 56 in close proximity to the rail 22. Adjacent poles 57 of the wheel are of opposite polarity, and are created by suitable windings, indicated at 58, which are connected by leads 59 to a suitable source of direct current. The same result can be obtained by the use of alternating current.

Obviously as the car moves to the left in Fig. 7 and the wheel 55 is rotated slowly in either direction (preferably, however, counterclockwise), each portion of the rail is subjected to an alternating flux of high intensity that gradually diminishes to zero.

The use of an alternating flux device of the type herein disclosed is not confined to any particular method of flaw detection, and in Fig. 8 there is a diagrammatic representation of the application of the device to the electro-inductive system of testing in which a strong direct current is passed into the rail by means of current brushes 60 and 61, between which an induction coil 62 is placed which records variations in the magnetic field surrounding the rail in the vicinity of fissures.

It should be understood that it is not only important to place the rail in a cyclic condition in order to obtain reproducible results, but it is also important to finish the demagnetization process by gradually reducing the flux to zero if the full objects are to be attained.

Throughout this specification the term "unidirectional flux" has been used in the sense that the flux is produced by a direct current magnet, by a permanent magnet, or by equivalent means.

I claim as my invention—

1. In apparatus for progressively testing metallic bodies for flaws, an alternating current magnet having a laminated core terminating in spaced poles adapted to move in contact with the metallic body, and means for moving the poles in a vertical direction relative to the magnet.

2. In apparatus for progressively testing metallic bodies for flaws, an alternating current magnet having a core terminating in spaced poles, the trailing pole including a face adapted to lie adjacent the metallic body and an arm that is positioned over the body under test for a substantial distance rearwardly of the face and is shaped to provide a gradually increasing air gap between said trailing pole and the body as the apparatus moves relative to the body.

3. In apparatus for progressively testing metallic bodies for flaws, an alternating current magnet having a laminated core terminating in spaced poles, and means for moving the poles in a vertical direction relative to the magnet, the trailing pole including a face adapted to lie adjacent the metallic body and an arm that is positioned over the body under test for a substantial distance rearwardly of the face and is shaped to provide a gradually increasing air gap between said trailing pole and the body as the apparatus moves relative to the body.

4. In apparatus for progressively testing metallic bodies for flaws, an alternating current magnet mounted on trunnions laterally spaced from the vertical plane including the body but parallel to the body, and poles for the magnet movable vertically relative to the body and the magnet by rotation of the magnet on its trunnions.

5. In apparatus for progressively testing metallic bodies for flaws, an alternating current magnet mounted on trunnions laterally spaced from the vertical plane including the body but parallel to the body, and poles for the magnet movable vertically relative to the body and the magnet by rotation of the magnet on its trunnions, the trailing pole of said magnet including an arm that is positioned over the body under test and shaped to provide a gradually increasing air gap between said trailing pole and the body as the apparatus moves relative to the body.

WALTER C. BARNES.